US011184099B2

(12) United States Patent
Tsuboi et al.

(10) Patent No.: US 11,184,099 B2
(45) Date of Patent: Nov. 23, 2021

(54) TERMINAL APPARATUS, BASE STATION APPARATUS, COMMUNICATION METHOD, AND INTEGRATED CIRCUIT

(71) Applicants: SHARP KABUSHIKI KAISHA, Sakai (JP); FG INNOVATION COMPANY LIMITED, Tuen Mun (HK)

(72) Inventors: Hidekazu Tsuboi, Sakai (JP); Shohei Yamada, Sakai (JP); Kazunari Yokomakura, Sakai (JP); Hiroki Takahashi, Sakai (JP); Tatsushi Aiba, Sakai (JP)

(73) Assignees: SHARP KABUSHIKI KAISHA, Sakai (JP); FG INNOVATION COMPANY LIMITED, Tuen Mun (HK)

( * ) Notice: Subject to any disclaimer, the term of this patent is extended or adjusted under 35 U.S.C. 154(b) by 0 days.

(21) Appl. No.: 16/317,370

(22) PCT Filed: Jul. 7, 2017

(86) PCT No.: PCT/JP2017/024950
§ 371 (c)(1),
(2) Date: Jan. 11, 2019

(87) PCT Pub. No.: WO2018/012422
PCT Pub. Date: Jan. 18, 2018

(65) Prior Publication Data
US 2019/0229826 A1 Jul. 25, 2019

(30) Foreign Application Priority Data

Jul. 14, 2016 (JP) .............................. JP2016-139176

(51) Int. Cl.
*H04W 72/04* (2009.01)
*H04J 11/00* (2006.01)

(52) U.S. Cl.
CPC ....... *H04J 11/0079* (2013.01); *H04J 11/0073* (2013.01); *H04J 11/0076* (2013.01); *H04W 72/04* (2013.01)

(58) Field of Classification Search
CPC ............. H04W 72/0446; H04W 88/08; H04W 72/0453; H04W 72/04; H04J 11/0076; H04J 11/0079; H04J 11/0073
See application file for complete search history.

(56) References Cited

U.S. PATENT DOCUMENTS 8,938,268 B2 * 1/2015 Zhang ................. H04J 11/0093
455/501
9,986,547 B2 * 5/2018 Yang .................... H04B 7/2656
(Continued)

FOREIGN PATENT DOCUMENTS

JP 2013-077926 A 4/2013
JP 2015-525519 A 9/2015
(Continued)

OTHER PUBLICATIONS

NTT Docomo, "Revision of SI: Study on New Radio Access Technology", 3GPP TSG RAN Meeting #72 RP-161214 Busan, Korea, Jun. 13-16, 2016.
(Continued)

*Primary Examiner* — Hassan A Phillips
*Assistant Examiner* — Prenell P Jones
(74) *Attorney, Agent, or Firm* — Finnegan, Henderson, Farabow, Garrett & Dunner LLP

(57) ABSTRACT

A terminal apparatus includes a receiver configured to receive a reference signal corresponding to a first subframe set constituted by one or a plurality of subframes and a first physical broadcast channel corresponding to the first subframe set,
wherein, the reference signal corresponding to the first subframe set is regarded as transmitted using the same
(Continued)

antenna port, and an antenna port used for transmitting the reference signal corresponding to the first subframe set and a first antenna port used for transmitting the first physical broadcast channel corresponding to the first subframe set are regarded as the same antenna port.

8 Claims, 9 Drawing Sheets

(56) References Cited

U.S. PATENT DOCUMENTS

| | | | |
|---|---|---|---|
| 10,091,659 B2* | 10/2018 | Ng | H04W 48/12 |
| 10,615,897 B2* | 4/2020 | Islam | H04L 25/022 |
| 2012/0263117 A1* | 10/2012 | Love | H04L 5/003 370/329 |
| 2013/0044678 A1* | 2/2013 | Qu | H04W 52/244 370/328 |
| 2013/0195069 A1 | 8/2013 | Frederiksen et al. | |
| 2013/0343318 A1* | 12/2013 | Gruet | H04L 25/0224 370/329 |
| 2014/0185495 A1* | 7/2014 | Kuchibhotla | H04L 5/0094 370/281 |
| 2014/0187283 A1* | 7/2014 | Nimbalker | H04W 76/14 455/550.1 |
| 2014/0226551 A1 | 8/2014 | Ouchi et al. | |
| 2014/0362756 A1* | 12/2014 | Maeda | H04L 65/4076 370/312 |
| 2015/0181568 A1 | 6/2015 | Seo et al. | |
| 2015/0230284 A1* | 8/2015 | Nimbalker | H04W 72/048 455/450 |
| 2016/0029379 A1* | 1/2016 | Kuchibhotla | H04W 4/90 370/329 |
| 2017/0013481 A1* | 1/2017 | Wang | H04W 72/0473 |
| 2017/0019886 A1* | 1/2017 | Patel | H04W 4/70 |
| 2017/0048883 A1* | 2/2017 | Guan | H04W 72/042 |
| 2017/0070312 A1* | 3/2017 | Yi | H04J 11/0069 |
| 2017/0105166 A1* | 4/2017 | Lee | H04W 68/005 |
| 2017/0195889 A1* | 7/2017 | Takeda | H04W 72/0446 |
| 2017/0223667 A1* | 8/2017 | Yi | H04J 11/0069 |
| 2017/0230818 A1* | 8/2017 | Park | H04W 8/02 |
| 2017/0255578 A1* | 9/2017 | Ngo | G06F 13/364 |
| 2017/0353254 A1* | 12/2017 | Islam | H04L 25/022 |
| 2017/0353255 A1* | 12/2017 | Islam | H04J 11/003 |
| 2017/0353256 A1* | 12/2017 | Islam | H04L 25/022 |
| 2017/0353257 A1* | 12/2017 | Islam | H04L 27/2657 |
| 2018/0070337 A1* | 3/2018 | Park | H04W 72/042 |
| 2018/0255565 A1* | 9/2018 | Guan | H04W 72/12 |
| 2018/0279388 A1* | 9/2018 | Miao | H04W 16/02 |
| 2019/0103931 A1* | 4/2019 | Yi | H04L 5/001 |
| 2019/0200315 A1* | 6/2019 | Tsai | H04L 5/0023 |
| 2020/0120482 A1* | 4/2020 | Parkvall | H04B 7/0452 |
| 2020/0287611 A1* | 9/2020 | Xiong | H04J 11/0076 |

FOREIGN PATENT DOCUMENTS

| | | |
|---|---|---|
| RU | 2481746 C2 | 5/2013 |
| WO | 9637079 A1 | 11/1996 |
| WO | 2004084450 A2 | 9/2004 |
| WO | 2006099229 A1 | 9/2006 |
| WO | 2012044240 A1 | 4/2012 |
| WO | 2013/166688 A1 | 11/2013 |
| WO | 2014/181443 A1 | 11/2014 |
| WO | 2015133823 A1 | 9/2015 |
| WO | 2015143244 A1 | 9/2015 |
| WO | 2016182955 A1 | 11/2016 |
| WO | 2017/039739 A1 | 3/2017 |

OTHER PUBLICATIONS

Samsung et al., "WF on Supported NR Operations", 3GPP TSG RAN WG1 #85 R1-165559 Nanjing, China, May 23-27, 2016.

Korean Intellectual Property Office, Notice of Preliminary Rejection in relation to Application No. 10-2019-7000967, dated Sep. 8, 2021 (7 pgs.).

LG Electronics, Overview on Design of Downlink for NB-IoT, 3GPP TSG RAN WG1 Meeting #82-bis, Malmo, Sweden, Oct. 5-9, 2015, R1-155799 (6 pgs.).

Intel Corporation, Remaining Details of NB-MIB Design, 3GPP TSG RAN WG1 NB-IoT Ad-Hoc Meeting, Sophia Antipolis, France, Mar. 22-24, 2016, R1-16188 (5 pgs.).

* cited by examiner

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on Japanese Patent Application No. 2016-139176 filed on Jul. 14, 2016, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP). In addition, the 3GPP is currently conducting a technical study and a standardization of LTE-Advanced Pro which is an extension technology of LTE and New Radio technology (NR) which is a new radio access technology, as a radio access method and a radio network technology for the fifth generation cellular system (NPL 1).

In the fifth generation cellular system, three kinds of massive Machine Type Communication (mMTC) in which a large number of machine type devices are connected are required as assumed scenarios of service, that is, eMBB (enhanced Mobile BroadBand) that realizes high-speed and large-capacity transmission, URLLC (Ultra-Reliable and Low Latency Communication) that realizes low delay and high reliability communication, and Internet to Things (IoT).

In LTE, in a case that the terminal apparatus starts communicating with the network via the base station apparatus, synchronization needs to be established, and a Synchronization Signal (SS) for that purpose is prepared. In LTE, the terminal apparatus detects a synchronization signal transmitted from the base station apparatus at a specific cycle, and based on the reception timing of the detected synchronization signal and information of the code sequence of the received synchronization signal, obtains synchronization of timing, synchronization of frequency, and a cell ID (PCI: Physical Cell ID). The terminal apparatus acquires broadcast information including information necessary for starting communication based on the acquired information.

In NR, in order to widen the coverage mainly in a high-frequency cell with high attenuation, covering the entire cell by setting a plurality of regions in the cell by beam forming and sequentially transmitting a signal to each region is discussed (NPL 2). Beamforming may also be referred to as precoding.

In NR, similarly to LTE, a synchronization signal for synchronizing a terminal apparatus and a base station apparatus is being studied.

CITATION LIST

Non Patent Literature

NPL 1: RP-161214, NTT DOCOMO, "Revision of SI: Study on New Radio Access Technology", June 2016

NPL 2: 3GPP R1-165559 http://www.3gpp.org/ftp/ts-g_ran/WG1_RL1/TSGR1_85/Docs/R1-165559.zip

SUMMARY OF INVENTION

Technical Problem

An embodiment of the present invention provides a terminal apparatus capable of efficiently starting communication with a base station apparatus, a base station apparatus configured to communicate with the terminal apparatus, a communication method used for the terminal apparatus, a communication method used for the base station apparatus, an integrated circuit implemented on the terminal apparatus, and an integrated circuit implemented on the base station apparatus.

Solution to Problem (1) In order to accomplish the object described above, an aspect of the present invention is contrived to provide the following means. That is, a first aspect of the present invention is a terminal apparatus having a receiver configured to receive a reference signal corresponding to a first subframe set constituted by one or a plurality of subframes and a first physical broadcast channel corresponding to the first subframe set, wherein, the reference signal corresponding to the first subframe set is transmitted using a same antenna port, and an antenna port used for transmitting the reference signal corresponding to the first subframe set and a first antenna port used for transmitting the first physical broadcast channel corresponding to the first subframe set are regarded as a same antenna port.

(2) In the first aspect of the present invention, an antenna port used for transmitting a reference signal corresponding to a second subframe set constituted by one or a plurality of subframes and a second antenna port used for transmitting a second physical broadcast channel corresponding to the second subframe set are regarded as a same antenna port.

(3) In the first aspect of the present invention, a synchronizer is provided configured to determine a position of a first subframe belonging to the first subframe set in a radio frame, wherein a position of the first subframe in the radio frame is indicated using a synchronization signal corresponding to the first subframe set.

(4) In the first aspect of the present invention, a position in a radio frame of a first subframe belonging to the first subframe set is indicated by broadcast information transmitted using the first antenna port.

(5) In the first aspect of the present invention, the broadcast information transmitted using the first antenna port includes information indicating whether a plurality of subframe sets are configured.

(6) In the first aspect of the present invention, the broadcast information transmitted using the first antenna port includes information for identifying a subframe set, information for identifying an antenna port, information for identifying a subframe to which the synchronization signal corresponding to the first subframe set is transmitted, or information for identifying a subframe to which the broadcast information transmitted using the first antenna port is transmitted.

(7) A second aspect of the present invention is a base station apparatus having a transmitter configured to transmit a reference signal corresponding to a first subframe set constituted by one or a plurality of subframes and a first physical broadcast channel corresponding to the first subframe set, wherein, the reference signal corresponding to the first subframe set is transmitted using a same antenna port, and an antenna port used for transmitting the reference signal corresponding to the first subframe set and a first antenna port used for transmitting the first physical broadcast channel corresponding to the first subframe set are regarded as a same antenna port.

(8) In the second aspect of the present invention, an antenna port used for transmitting a reference signal corresponding to a second subframe set constituted by one or a plurality of subframes and a second antenna port used for transmitting a second physical broadcast channel corresponding to the second subframe set are regarded as a same antenna port.

(9) A third aspect of the present invention is a communication method applied to a terminal apparatus, the method at least including the step of receiving a reference signal corresponding to a first subframe set constituted by one or a plurality of subframes and a first physical broadcast channel corresponding to the first subframe set, wherein, the reference signal corresponding to the first subframe set is transmitted using a same antenna port, and an antenna port used for transmitting the reference signal corresponding to the first subframe set and a first antenna port used for transmitting the first physical broadcast channel corresponding to the first subframe set are regarded as a same antenna port.

(10) In the third aspect of the present invention, an antenna port used for transmitting a reference signal corresponding to a second subframe set constituted by one or a plurality of subframes and a second antenna port used for transmitting a second physical broadcast channel corresponding to the second subframe set are regarded as a same antenna port.

(11) A forth aspect of the present invention is an integrated circuit implemented on a terminal apparatus, the integrated circuit causing the terminal apparatus to receive a reference signal corresponding to a first subframe set constituted by one or a plurality of subframes and a first physical broadcast channel corresponding to the first subframe set, wherein, the reference signal corresponding to the first subframe set is transmitted using a same antenna port, and an antenna port used for transmitting the reference signal corresponding to the first subframe set and a first antenna port used for transmitting the first physical broadcast channel corresponding to the first subframe set are regarded as a same antenna port.

(12) In the fourth aspect of the present invention, an antenna port used for transmitting a reference signal corresponding to a second subframe set constituted by one or a plurality of subframes and a second antenna port used for transmitting a second physical broadcast channel corresponding to the second subframe set are regarded as a same antenna port.

Advantageous Effects of Invention

According to the present invention, a terminal apparatus and a base station apparatus can efficiently communicate with each other.

DESCRIPTION OF EMBODIMENTS

Embodiments of the present invention will be described below.

A radio communication system and a radio network according to the present embodiment will be described.

Figure 1:
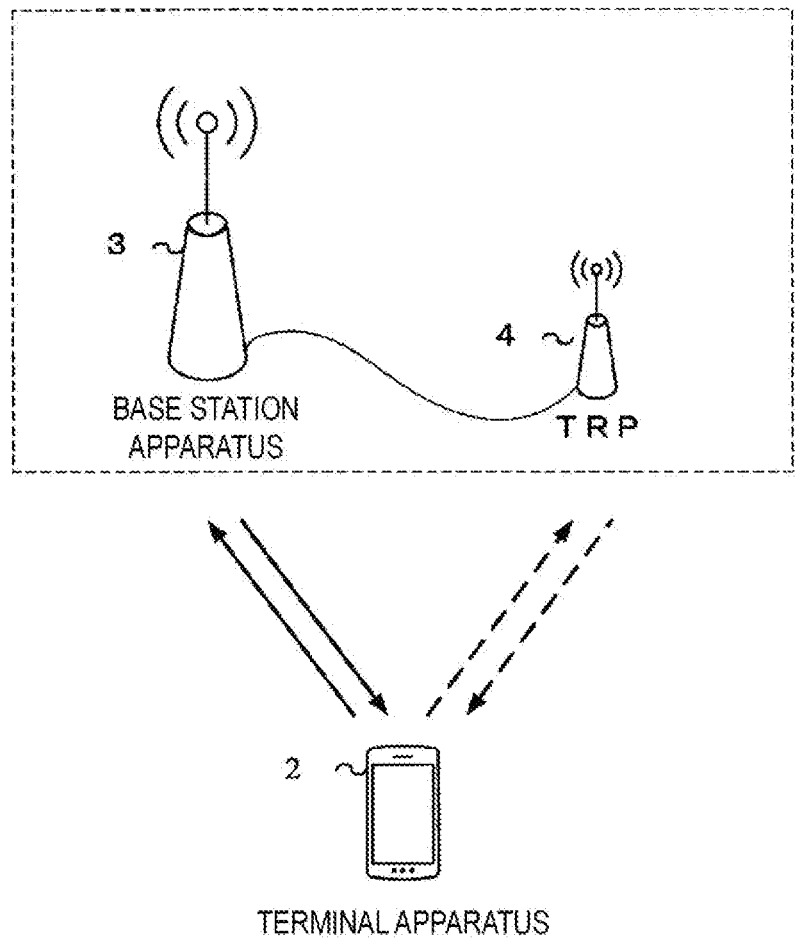
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 2 and a base station apparatus 3. In addition, the base station apparatus 3 may include one or a plurality of transmission reception points (TRP) 4. The base station apparatus 3 may serve the terminal apparatus 2 by setting a communicable range (communication area) controlled by the base station apparatus 3 as one or a plurality of cells. In addition, the base station apparatus 3 may serve the terminal apparatus 2 by setting a communicable range (communication area) controlled by one or a plurality of transmission reception points 4 as one or a plurality of cells. Further, one cell may be divided into a plurality of beamed areas, and the terminal apparatus 2 may be served in each beamed area. Here, the beamed area may be identified by a precoding index.

Here, the communication area covered by the base station apparatus 3 may be different in size and shape for each frequency. Moreover, the covered area may be different for each frequency. Further, a radio network, in which cells of different base station apparatuses 3 types and of different cell radii are mixed in same or different frequencies, that constitutes a single communication system, is referred to as a heterogeneous network.

The radio communication link from the base station apparatus 3 to the terminal apparatus 2 is referred to as a downlink. The radio communication link from the terminal apparatus 2 to the base station apparatus 3 is referred to as an uplink. The radio communication link from the terminal apparatus 2 to another terminal apparatus 2 is referred to as a sidelink.

In FIG. 1, in radio communication between the terminal apparatus 2 and the base station apparatus 3 and/or radio communication between the terminal apparatus 2 and another terminal apparatus 2, an Orthogonal Frequency Division Multiplexing (OFDM) including Cyclic Prefix (CP), a Single-Carrier Frequency Division Multiplexing (SC-FDM), a Discrete Fourier Transform Spread OFDM (DFT-S-OFDM), or a Multi-Carrier Code Division Multiplexing (MC-CDM) may be used.

Further, in FIG. 1, in radio communication between the terminal apparatus 2 and the base station apparatus 3 and/or radio communication between the terminal apparatus 2 and another terminal apparatus 2, a Universal-Filtered Multi-Carrier (UFMC), a Filtered OFDM (F-OFDM), a Windowed OFDM, or a Filter-Bank Multi-Carrier (FBMC), may be used.

Further, in FIG. 1, in radio communication between the terminal apparatus 2 and the base station apparatus 3 and/or radio communication between the terminal apparatus 2 and another terminal apparatus 2, the above-described transmission methods without using a CP or with a zero padding in place of a CP may be used. Further, the CP or the zero padding may be added both in the front and in the back.

The terminal apparatus 2 operates by regarding the inside of a cell as a communication area. The terminal apparatus 2 may move to another suitable cell through a cell re-selection procedure at the time with no radio connection (also referred to as an idle state, or an RRC_IDLE state), and through a handover procedure at the time with a radio connection (also referred to as a connected state, or an RRC_CONNECTED state). A suitable cell generally indicates a cell to which an access from the terminal apparatus 2 is determined not prohibited based on information specified by the base station apparatus 3, and a cell with a downlink reception quality that satisfies a predefined condition.

In a case that a terminal apparatus 2 is capable of communicating with a certain base station apparatus 3, out of the cells of the base station apparatus 3, a cell configured to be used for communicating with the terminal apparatus 2 may be referred to as a "Serving cell", and other cells not used for the communication may be referred to as a "Neighboring cell". In addition, a neighboring cell that broadcasts or notifies to the terminal apparatus 2 some or all of the system information required in the serving cell are also referred to as an auxiliary cell.

According to the present embodiment, one or a plurality of serving cells are configured for the terminal apparatus 2. The plurality of configured serving cells include one primary cell and one or a plurality of secondary cells. The primary cell is a serving cell in which an initial connection establishment procedure has been performed, a serving cell in which a connection re-establishment procedure has been started, or a cell indicated as a primary cell in a handover procedure. One or a plurality of secondary cells may be configured at a point of time when a Radio Resource Control (RRC) connection is established, or after the RRC connection is established.

Time Division Duplex (TDD) and/or Frequency Division Duplex (FDD) may be applied to a radio communication system according to the present embodiment. A Time Division Duplex (TDD) scheme or a Frequency Division Duplex (FDD) scheme may be applied to all of the plurality of cells. Cells to which the TDD scheme is applied and cells to which the FDD scheme is applied may be aggregated.

Physical channels and physical signals in the present embodiment will be described.

With respect to FIG. 1, the following physical channels are used for radio communication between the terminal apparatus 2 and the base station apparatus 3. The physical channel is used for transmitting information output from a higher layer.

Physical Broadcast CHannel (PBCH)
Physical Control CHannel (PCCH)
Physical Shared CHannel (PSCH)
Physical Random Access CHannel (PRACH)

The PBCH is used by the base station apparatus 3 to broadcast the important information blocks (MIB: Master information Block and EIB: Essential Information Block) including important system information (Essential information) required by the terminal apparatus 2. Here, one or a plurality of important information blocks may be transmitted as an important information message. For example, the important information block may include information on a position in a superframe constituted by a plurality of radio frames (for example, information indicating a part or all of the frame numbers (SFN: System Frame Number) in a superframe). In addition, in a case that important information blocks different for each area in the cell are transmitted, information to enable identification of the area (for example, identifier information of the transmission beam constituting the area) may be included. Here, identifier information of a beamed area may be indicated by a precoding index. In addition, in a case that important information blocks (important information message) different for each area in the cell are transmitted, information to enable identification of the temporal position (for example, the subframe number of a subframe that includes the important information blocks (important information message)) may be included. That is, information for determining each of the subframe number of the subframes in which each transmission of important information blocks (important information messages) using indices of different pre-coding is performed may be included. For example, the important information may include information necessary for connection to a cell and mobility.

The PCCH is used to transmit Uplink Control information (UCI) in the case of an uplink radio communication (radio communication from the terminal apparatus 2 to the base station apparatus 3). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). The HARQ-ACK may indicate the HARQ-ACK for downlink data (Transport block, Medium Access Control Protocol Data Unit: MAC PDU, Downlink-Shared Channel: DL-SCH).

In addition, the PCCH is used to transmit downlink control information (DCI) in the case of a Downlink Control Information (radio communication from the base station apparatus 3 to the terminal apparatus 2). Here, one or a plurality of DCIs (may be referred to as the DCI format) are defined for a transmission of the downlink control information. That is, a field for the downlink control information is defined as a DCI and is mapped to information bits.

For example, DCI including information indicating whether the signal included in the scheduled PSCH is downlink wireless communication or uplink wireless communication may be defined as DCI.

For example, DCI including information indicating the transmission period of the downlink included in the scheduled PSCH may be defined as DCI.

For example, DCI including information indicating the transmission period of the uplink included in the scheduled PSCH may be defined as DCI.

For example, DCI including information indicating the timing of transmitting the HARQ-ACK for the scheduled PSCH (for example, the number of symbols from the last symbol included in the PSCH to the HARQ-ACK transmission) may be defined as DCI.

For example, DCI including information indicating the transmission period of the downlink, gap and transmission period of the uplink included in the scheduled PSCH may be defined as DCI.

For example, DCI used for the scheduling of one downlink radio communication PSCH in one cell (transmission of a single downlink transport block) may be defined as DCI.

Furthermore, for example, DCI used for the scheduling of one uplink radio communication PSCH in one cell (transmission of a single uplink transport block) may be defined as DCI.

Here, the DCI includes information on the scheduling of the PSCH in a case that the PSCH includes an uplink or a downlink. Here, the DCI for the downlink is also referred to as a downlink grant or a downlink assignment. Here, the DCI for the uplink is also referred to as an uplink grant or an uplink assignment.

PSCH is used for transmitting uplink data (UL-SCH: Uplink Shared CHannel) or downlink data (DL-SCH: downlink shared CHannel) from the Medium Access Control (MAC). In the case of a downlink, it is also used for transmitting system information (SI) and Random Access Response (RAR). In the case of an uplink, the PSCH may be used to transmit the HARQ-ACK and/or CSI along with the uplink data. Furthermore, the PSCH may be used for transmitting the CSI only or the HARQ-ACK and the CSI only. That is, the PSCH may be used to transmit UCI only.

Here, the base station apparatus 3 and the terminal apparatus 2 exchange (transmit/receive) a signal between them at a higher layer. For example, the base station apparatus 3 and the terminal apparatus 2 may transmit and receive Radio Resource Control (RRC) signaling (also referred to as RRC message: Radio Resource Control message, or RRC information: Radio Resource Control information) in the RRC layer. In addition, the base station apparatus 3 and the terminal apparatus 2 may transmit and receive a Medium Access Control (MAC) control element in a MAC layer. Here, the RRC signaling and/or the MAC control element is also referred to as higher layer signaling.

The PSCH may be used to transmit the RRC signaling and the MAC control element. Here, the RRC signaling transmitted from the base station apparatus 3 may be signaling common to multiple terminal apparatuses 2 in a cell. In addition, the RRC signaling transmitted from the base station apparatus 3 may be signaling dedicated to a certain terminal apparatus 2 (also referred to as dedicated signaling). That is, terminal apparatus-specific (UE-specific) information may be transmitted through signaling dedicated to the certain terminal apparatus 2. The PSCH may be used for transmitting UE capability in the uplink.

It is to be noted that while PCCH and PSCH use the same designation for downlink and uplink, different channels may be defined for downlink and uplink. For example, the downlink PCCH may be defined as PDCCH (Physical Downlink Control CHannel) and the uplink PCCH may be defined as PUCCH (Physical Uplink Control CHannel). For example, the downlink PSCH may be defined as PDSCH (Physical Downlink Shared CHannel) and the uplink PSCH may be defined as PUSCH (Physical Uplink Shared CHannel).

The PRACH may be used to transmit a random access preamble (random access message 1). The PRACH may be used for indicating an initial connection establishment procedure, a handover procedure, a connection re-establishment procedure, synchronization (timing adjustment) for uplink transmission, and a request for the PUSCH (UL-SCH) resource.

In the CRC parity bits attached to a downlink grant or an uplink grant, an identifier information such as, a Cell-Radio Network Temporary Identifier (C-RNTI), a Temporary C-RNTI, a Semi Persistent Scheduling (SPS) Cell-Radio Network Temporary identifier (C-RNTI), may be exclusive ORed. The C-RNTI and the SPS C-RNTI may be used as identifiers for identifying a terminal apparatus 2 within a cell. The Temporary C-RNTI may be used in a contention based random access procedure.

The C-RNTI may be used to control the PDSCH or the PUSCH in one subframe. The SPS C-RNTI may be used for periodically allocating a resource for the PDSCH or the PUSCH. The Temporary C-RNTI may be used at the time of random access.

In FIG. 1, the following downlink physical signals may be used for downlink radio communication.

Synchronization Signal (SS)
Reference Signal (RS)

The synchronization signal may be used for the terminal apparatus 2 to perform a synchronization in the frequency domain and the time domain in the downlink. The synchronization signal may include Primary Synchronization Signal (PSS) and/or Secondary Synchronization Signal (SSS). Also, the synchronization signal may be used by the terminal apparatus 2 for precoding or beam selection in precoding or beam forming by the base station apparatus 3. Namely, the synchronization signal may be used by the terminal apparatus 2 to determine the precoding index or beam index applied to the downlink signal by the base station apparatus 3.

The downlink reference signal (hereinafter also referred to simply as a "reference signal") is used mainly for the terminal apparatus 2 to perform channel compensation on a downlink physical channel. That is, the downlink reference signal may include a demodulation reference signal. The Downlink Reference Signal may be used for the terminal apparatus 2 to calculate the downlink Channel State Information. That is, the downlink reference signal may include a channel state reference signal. In addition, the downlink reference signal may be used for determining numerology with respect to radio parameters and a subcarrier spacing, and fine synchronization to allow window synchronization of FFT and the like.

The BCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). The transport block is a unit of data that the MAC layer delivers to the physical layer. In the physical layer, the transport block is mapped to a codeword, and coding processing is performed for each codeword.

A radio communication protocol configuration according to the present embodiment will be described.

In the present embodiment, a protocol stack that handles user data of the terminal apparatus 2 and the base station apparatus 3 is referred to as a user plane (UP (User-plane, U-Plane)) protocol stack, and a protocol stack that handles control data is referred to as a control plane (CP (Control-plane, C-Plane)) protocol stack.

The physical layer (PHY layer) uses the physical channels to provide a transmission service to a higher layer. The PHY layer is connected with a Medium Access Control layer (MAC layer), which is a higher layer, via the transport channels. The data is exchanged via the transport channels between layers, that is, the MAC layer and the PHY layer. The data is transmitted and/or received via the physical channels between the PHY layers of the terminal apparatus 2 and the base station apparatus 3.

The MAC layer maps various logical channels to the various transport channels. The MAC layer is connected with a Radio Link Control layer (RLC layer), which is a higher layer, via the logical channels. The logical channels are roughly classified depending on the type of the transmitted information, specifically, classified into the control channels transmitting the control information and the traffic channels transmitting the user information. The MAC layer has a function to control the PHY layer in order to perform the Discontinuous Reception and Transmission (DRX and DTX), a function to perform the random access procedure, a function to report transmit power information, a function to perform the HARQ control, and the like.

The RLC layer performs segmentation or concatenation of the data received from the higher layer to adjust its data size so that a lower layer can appropriately transmit the data. The RLC layer also has a function to ensure Quality of Service (QoS) demanded by each data. In other words, the RLC layer has a function of data re-transmission control or the like.

A Packet Data Convergence Protocol layer (PDCP layer) has a header compression function to compress unnecessary control information in order to efficiently transmit an IP packet, which is the user data, in a radio segment. The PDCP layer also has a data encryption function.

A Radio Resource Control layer (RRC layer) is present in the Control-Plane protocol stack. The RRC layer performs configuration and reconfiguration of Radio Bearers (RBs) to control the logical channels, the transport channels, and the physical channels. RBs may be classified into a Signaling Radio Bearer (SRB) and a Data Radio Bearer (DRB), and SRB may be used as a path for transmitting an RRC message, which is the control information. DRB may be used as a path for transmitting the user data. Respective RBs may be configured between the RRC layers of the base station apparatus 3 and the terminal apparatus 2.

Note that the PHY layer corresponds to a physical layer as the first layer in the layered structure of the commonly known Open Systems Interconnection (OSI) model. The MAC layer, the RLC layer, and the PDCP layer correspond to a data link layer as the second layer in the OSI model. The RRC layer corresponds to a network layer as the third layer in the OSI model.

The above-described functional classification of the MAC layer, the RLC layer and the PDCP layer is merely an example, and a part or all of each function does not have to be mounted. In addition, some or all of the functions of each layer may be included in another layer.

Signaling protocols used between the network and a terminal apparatus 2 are divided into an Access Stratum (AS) protocol and a Non-Access Stratum (NAS) protocol. For example, the protocol in the RRC layer and its lower layers is the Access Stratum protocol used between the terminal apparatus 2 and the base station apparatus 3. Further, the protocol in Connection Management (CM), Mobility Management (MM), or the like of the terminal apparatus 2 is the Non-Access Stratum protocol, and is used between the terminal apparatus 2 and a core network (CN). For example, communication using the Non-Access Stratum protocol is transparently performed via the base station apparatus 3 between the terminal apparatus 2 and a Mobility Management Entity (MME).

An example configuration of a radio frame according to the present embodiment will be described below.

Figure 4:
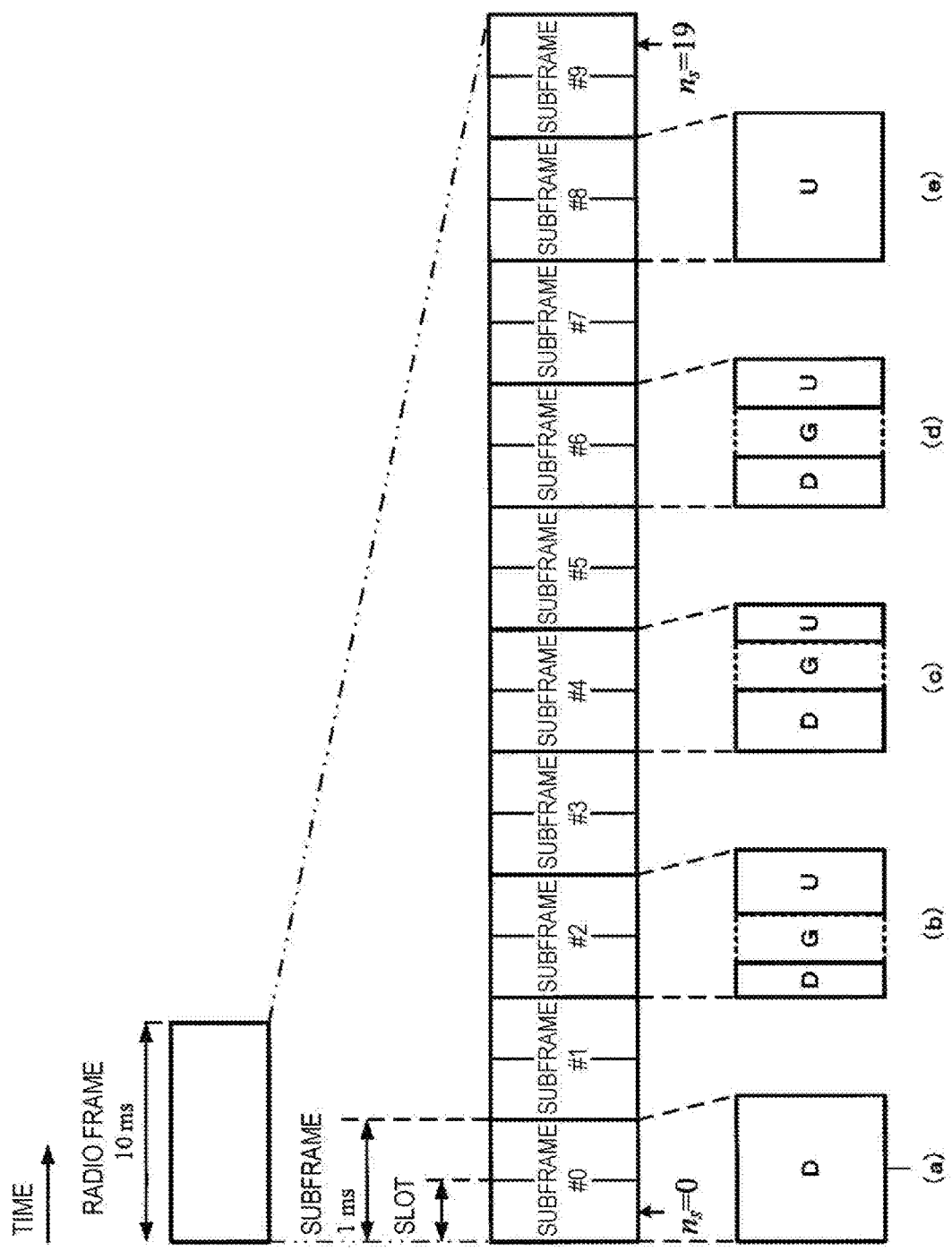
FIG. 4 is a diagram illustrating an example of a radio frame structure according to an embodiment of the present invention.

FIG. 4 is a diagram illustrating an example of a structure of a radio frame according to the present embodiment. In FIG. 4, the horizontal axis is a time axis. One radio frame may be constituted by a plurality (for example, twenty) of consecutive slots in the time domain. FIG. 4 illustrates an example in which one radio frame is constituted by 20 slots of Ns=0 to 19. Further, one subframe may be constituted by a plurality of consecutive (for example, two) slots. FIG. 4 illustrates an example in which one subframe is constituted by two slots. Here, the subframe may be simply expressed as a certain time domain (time period).

Further, as illustrated in FIG. 4, the subframe may be constituted by a part (downlink part) "D" used for downlink transmission, a part (uplink part) "U" used for uplink transmission, and a part (gap) "G" for switching between uplink and downlink. As illustrated in FIG. 4, in one subframe, one or a plurality of
 a downlink part,
 a gap, and
 an uplink part
 or a combination thereof may be included. In FIG. 4, as an example, the case where the time section is one subframe will be described, but the present invention is not limited thereto, and a plurality of time sections may be included in one subframe, or a time section may be constituted by a plurality of subframes (or slots).

In FIG. 4, reference sign (a) illustrates an example in which an entire subframe is used for downlink transmission. In FIG. 4, reference sign (b) is an example in which, in the first time resource, the uplink scheduling is performed for example via the PCCH; in the next time resource, a gap is provided which is needed for the PCCH processing delay, the switching time from the downlink to the uplink, and generation of the transmission signal; and in the next time resource, transmission of the uplink signal is performed. In FIG. 4, reference sign (c) is an example in which, in the first time resource, the transmission of the downlink PCCH and/or the downlink PSCH is performed; in the next time resource, a gap is provided for the processing delay and the switching time from the downlink to the uplink; and in the next time resource, transmission of the PSCH or the PCCH is performed. Here, the uplink signal may be used for transmission of the HARQ-ACK and/or the CSI, namely the UCI. In FIG. 4, reference sign (d) illustrates that, in the first time resource, the transmission of the downlink PCCH and/or the downlink PSCH is performed; in the next time resource, a gap necessary for the processing delay, the switching time from the downlink to the uplink, and generation of the transmission signal are provided; and in the next time resource, transmission of the uplink PSCH and/or PCCH is performed. Here, the uplink signal may be used for transmitting the uplink data, namely, UL-SCH. In FIG. 4, reference sign (e) illustrates an example in which an entire subframe is used for uplink transmission (uplink PSCH or PCCH).

The above-mentioned downlink part and the uplink part may be constituted by one or a plurality of OFDM symbols or SC-FDMA symbols.

Figure 5:
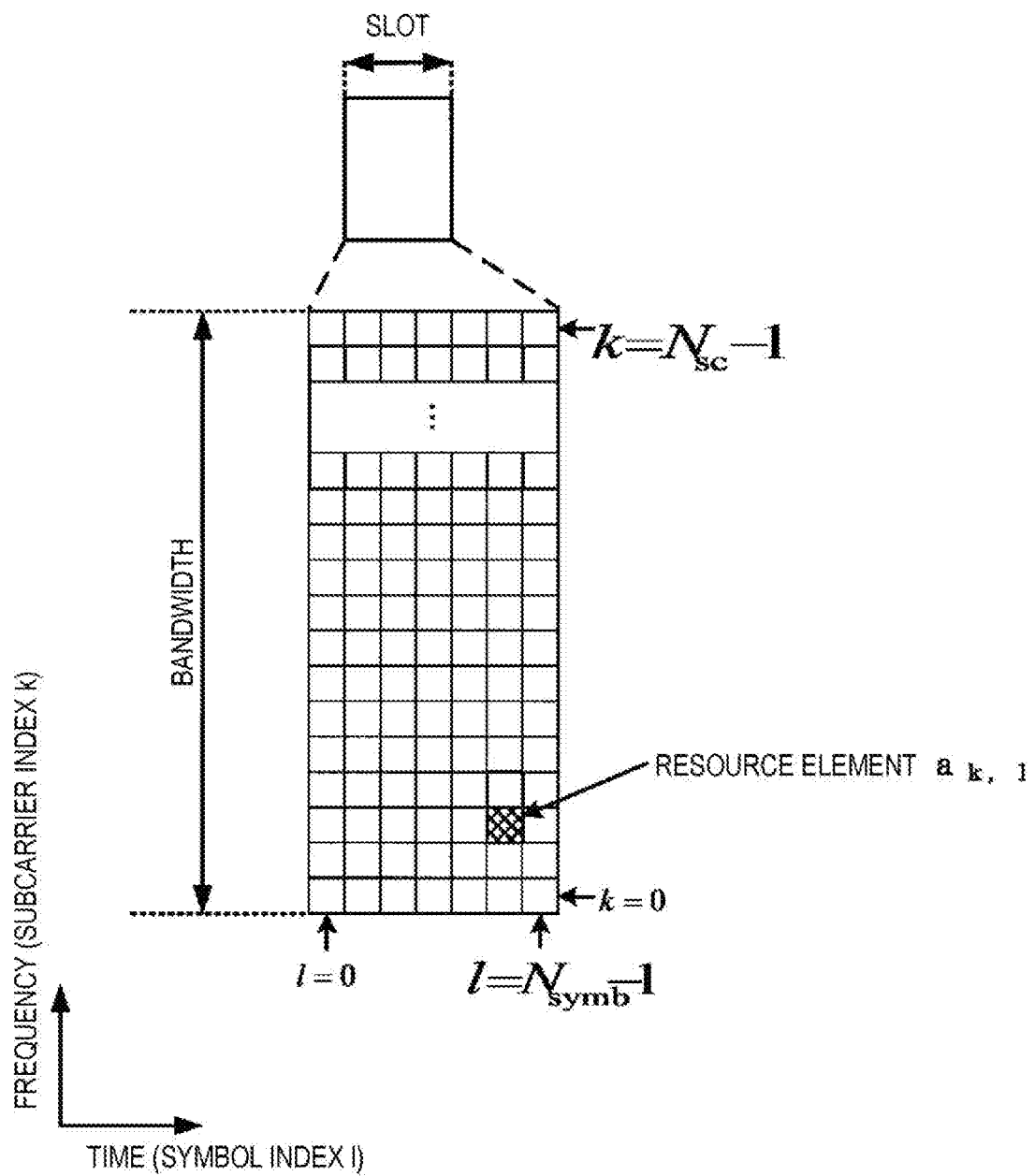
FIG. 5 is a diagram illustrating an example of a detail of a radio frame structure according to an embodiment of the present invention.

A resource grid as illustrated in FIG. 5 may be defined by a plurality of subcarriers and a plurality of OFDM symbols or SC-FDMA symbols.

In FIG. 5, l is a symbol number/index, and k is a subcarrier number/index. Here, the symbols may be OFDM (Orthogonal Frequency Division Multiplexing) symbols or SC-FDMA (Single Carrier Frequency Division Multiple Access) symbols. $N_{SC}$ is the total number of subcarriers included in the bandwidth of the resource grid. The number of subcarriers of the resource grid may be set depending on a cell bandwidth. $N_{symb}$ is the total number of symbols included in the resource grid. $N_{symb}$ may be given also based on the subcarrier spacing.

Each element within the resource grid is referred to as a resource element. The resource element $a_{k,l}$ may be expressed by a subcarrier number/index k and a symbol number/index l. Resources for transmitting physical signals or physical channels may be represented by this resource element. The resource grid and/or the resource element may be defined for each antenna port.

Here, it is defined that, in an antenna port, a channel conveyed by a certain symbol of a certain antenna port may be estimated from the channel conveyed by another symbol of the same antenna port. That is, for example, in a case that the first physical channel and the first reference signal are conveyed with symbols of the same antenna port, the channel compensation of the first physical channel may be performed by the first reference signal. Here, the same antenna port may mean that the number of the antenna port (the number for identifying the antenna port) is the same.

Figure 6:
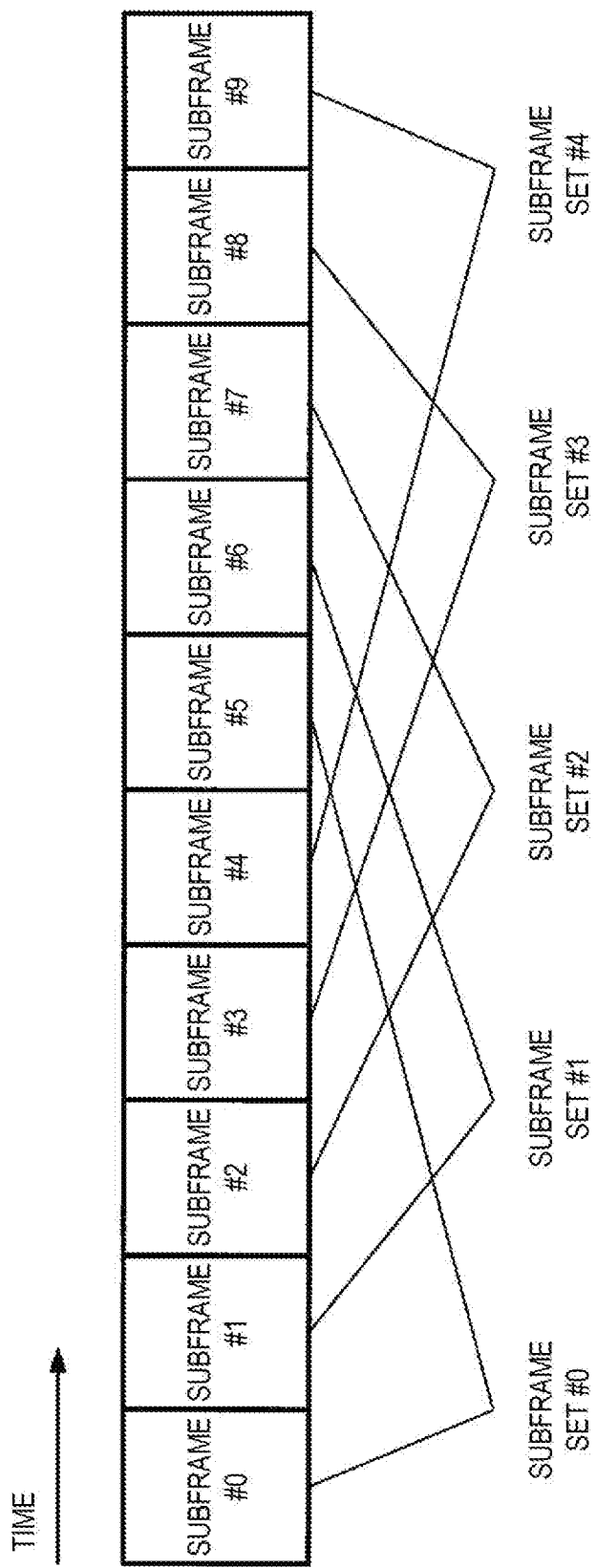
FIG. 6 is a diagram illustrating an example of subframe sets according to an embodiment of the present invention.

The radio frame may include a subframe set constituted by one or a plurality of subframes. Further, the radio frame may include a plurality of subframe sets. For example, in FIG. 6, five subframe sets constituted by two subframes are included in the radio frame. In the example of FIG. 6, a subframe set is constituted by equally spaced subframes, but the present invention is not limited thereto, and a subframe set may be constituted by a plurality of subframes at consecutive positions, and a subframe set having a different number of subframes may be configured depending on the type of service, the number of users, and the like. That is, in a radio frame, a subframe set to which one or a plurality of subframes belong may be defined (configured). In addition, one or a plurality of subframe sets may be defined (configured) in the radio frame. Here, the fifth predefined value may be a value defined by specification information or the like, and may be known to both the base station apparatus 3 and the terminal apparatus 2. Here, the one or the plurality of subframe sets may be the information defined by specification or the like, and may be known to both the base station apparatus 3 and the terminal apparatus 2. Here, the information (signal) may include a synchronization signal and/or a reference signal.

The terminal apparatus 2 may regard the synchronization signal and the reference signal in the same subframe set to be transmitted through one or a plurality of antenna ports configured in the subframe set. That is, one or a plurality of antenna ports corresponding to one or a plurality of subframe sets may be defined (configured). Also, the terminal apparatus 2 may regard the antenna ports of the synchronization signal and the reference signal in the same subframe set to be Quasi co-located. Also, the terminal apparatus 2 may regard the antenna ports of the synchronization signal and the reference signal in the same subframe set to be Quasi co-located. Further, even in the transmission of the synchronization signal and/or the reference signal in the same subframe set, the terminal apparatus 2 may regard that a transmission of the synchronization signal and/or the reference signal in a certain subframe is not performed through the same antenna port through which a transmission of the synchronization signal and/or the reference signal in another subframe is performed.

That is, for the transmission of the synchronization signal and the transmission of the reference signal in one or a plurality of subframes belonging to one subframe set, it may be regarded that one or a plurality of antenna ports corresponding to that one subframe set is used. Also, it may be regarded that the antenna port used for the transmission of the synchronization signal in one or a plurality of subframes belonging to one subframe set, and the antenna port used for the transmission of the reference signal, are quasi co-located. That is, for the transmission of the Synchronization Signal (transmission of one or a plurality of synchronization signals) in one or a plurality of subframes belonging to one subframe set, it may be regarded that one or a plurality of antenna ports (the same antenna ports) corresponding to that one subframe set is used. That is, for the transmission of the reference signal (transmission of one or a plurality of reference signals) in one or a plurality of subframes belonging to one subframe set, it may be regarded that one or a plurality of antenna ports (the same antenna ports) corresponding to that one subframe set is used.

Here, if the large-scale properties of the channel on which the symbol of one antenna port is conveyed can be estimated from the channel on which the symbol of the other antenna port is conveyed, then the two antenna ports are quasi co-located. The large-scale properties include part or all of (1) delay spread, (2) Doppler spread, (3) Doppler shift, (4) Average gain, and (5) Average delay. For example, in a subframe set, the terminal apparatus 2 may regard that, out of the large-scale properties of the channel on which the symbols of the synchronization signal and the reference signal are conveyed, a Doppler shift and average gain may be estimated from the channel of another antenna port on which symbols are conveyed.

In addition, the terminal apparatus 2 may regard the synchronization signal and the reference signal in the same subframe set to be transmitted through the same antenna port. That is, for the transmission of the synchronization signal and the transmission of the reference signal in one or a plurality of subframes belonging to one subframe set, it may be regarded that the same antenna port is being used.

Figure 7:
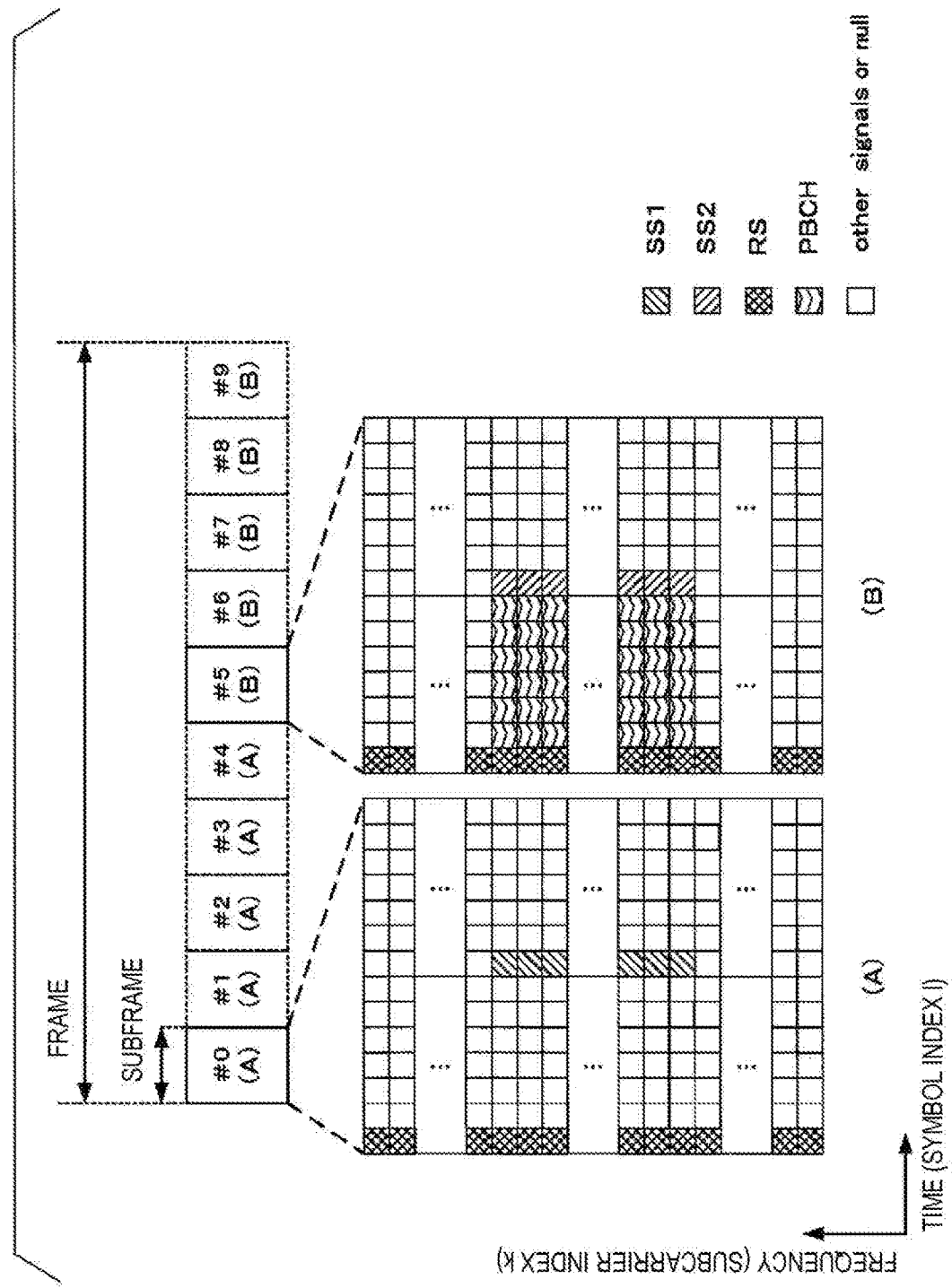
FIG. 7 is a diagram illustrating an example of a signal arrangement of a radio frame according to an embodiment of the present invention.
Figure 8:
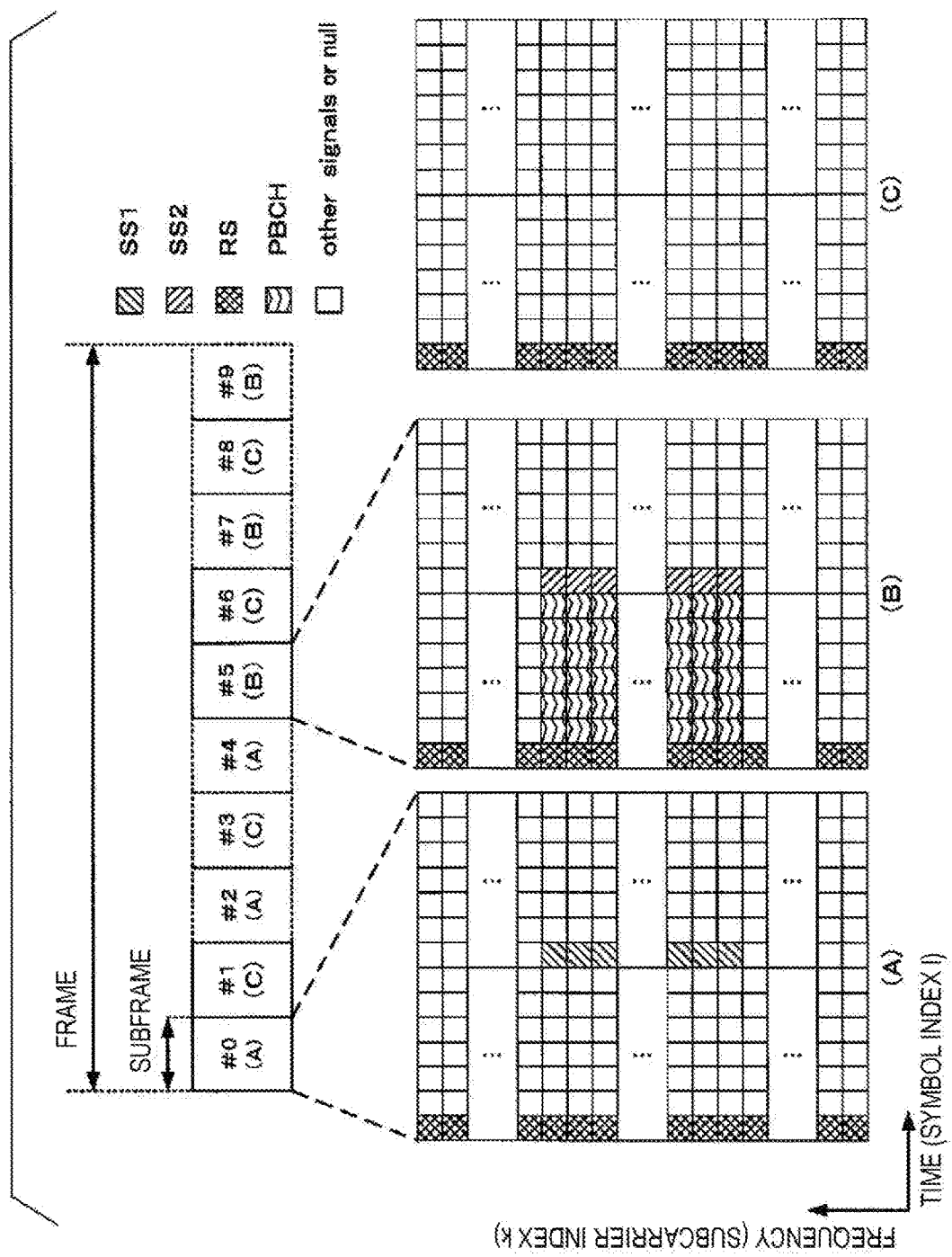
FIG. 8 is a diagram illustrating another example of a signal arrangement of a radio frame according to an embodiment of the present invention.

Next, an example of a frame configuration according to the present embodiment will be illustrated in FIGS. 7 and 8.

FIG. 7 is a diagram illustrating an example of a structure of a radio frame according to the present embodiment, in a case that there are five beamed areas. In FIG. 7, a reference signal, a synchronization signal and a PBCH are disposed in subframe #0 and subframe #5 (signals of reference signs (A) and (B) of FIG. 7 are disposed to subframe #0 and subframe #5 respectively). For example, the reference signal, the synchronization signal, and the PBCH transmitted in subframe #0 and subframe #5 are transmitted to certain beamed areas. Here, as illustrated in the figure, the reference signal and the synchronization signal may be transmitted at the same transmission timing. Also, the reference signal and the PBCH may be transmitted at the same transmission timing. Also, the synchronization signal and the PBCH may be transmitted at the same transmission timing. That is, the reference signal, the synchronization signal, and/or the PBCH may be transmitted together. For example, if in subframe #0 and subframe #5 the antenna port numbers are the same, the reference signal may be used for the PBCH demodulation. Here, subframe set #0 is constituted by subframe #0 and subframe #5. Similarly, the reference signal, the synchronization signal, and the PBCH are disposed in subframe #1 and subframe #6. For example, the reference signal, the synchronization signal and the PBCH transmitted in subfrarne #1 and subframe #6 are transmitted to different beamed areas. Here, subframe set #1 is constituted by subframe #1 and subframe #6. The remaining subframe sets #3, #4, and #5 are configured similarly.

Similarly, FIG. 8 is a diagram illustrating an example of a structure of frame in a case that there are three beamed areas. In FIG. 8, a reference signal, a synchronization signal and a PBCH are disposed in subframe #0, subframe #1, subframe #5, and subframe #6 (in FIG. 8, signals of reference sign (A) are disposed to subframe #0, signals of reference sign (B) are disposed to subframe #5, and signals of reference sign (C) are disposed to subframe #1 and subframe #6). For example, the reference signal, the synchronization signal, and the PBCH transmitted in subframe #0, subframe #1, and subframe #5 are transmitted to certain beamed areas. Here, subframe set #0 is constituted by this subframe #0, subframe #1, subframe #5, and subframe #6. Similarly, as subframe set #1, in FIG. 8, signals of reference sign (A) are disposed to subframe #2, signals of reference sign (B) to subframe #7, and signals of reference sign (C) to subframe #3 and subframe #8. For subframe set #2, signals of reference sign (C) are not disposed, and signals of reference signs (A) and (B) are disposed to subframe #4 and subframe #9, respectively.

The base station apparatus 3 transmits signals of frame structures as illustrated in FIG. 7 or FIG. 8, or of other various structure. For example, the base station apparatus 3 may transmit a signal of a frame structure according to the number of beamed areas. At this time, the base station apparatus 3 transmits a signal within one subframe set using the same antenna port (or a set of antenna ports). In other words, transmission between different subframe sets may be performed by using different antenna ports (or a set of antenna ports). Also, independent antenna ports (or sets of antenna ports) may be used for each subframe set. Here, "transmitting a signal using the same set of antenna ports" may mean, for example, that all physical signals and physical channels, or a part thereof, are transmitted through a plurality of common antenna ports, or that the physical signal and the physical channel are transmitted through independent or common antenna ports, and these antenna ports do not change within the subframe set.

Next, the operation of the terminal apparatus 2 that receives a signal of the frame structure in FIGS. 7 and 8 will be described.

The terminal apparatus 2 in the RRC_IDLE state in which the RRC connection has not been established does not recognize the number of beamed areas in the cell prior to receiving the synchronization signal. Therefore, the terminal apparatus 2 performs up to the demodulation of the PBCH based on the (predefined) relative position information of the subframe including the synchronization signal, the reference signal, and the PBCH transmitted in the same subframe set.

Specifically, first, the terminal apparatus 2 detects a synchronization signal which is a signal of a known sequence. That is, the synchronization signal is constituted by one or a plurality of sequences of the sequence.

The terminal apparatus 2 can, from the timing of receiving the synchronization signal, establish time synchronization (symbol synchronization) with the cell that transmits the synchronization signal. Furthermore, in a case that the synchronization signal is constituted by the sequence generated partially or entirely based on the cell identifier information, the terminal apparatus 2 can identify part of or all the cell identifier information transmitting the cell by identifying sequence of the received synchronization signal. In the examples of FIG. 7 and FIG. 8, since the synchronization signal is disposed in two different subframes, the terminal apparatus 2 may recognize whether the synchronization signal is SS1 or SS2 from the sequence of the detected synchronization signal, the cyclic shift, and/or the combination of the sequence of the synchronization signal and the cyclic shift, and the like.

For the sequence of the synchronization signal, a sequence in which the cell identifier and/or the subframe set information and/or the subframe number are uniquely associated with may be used. That is, a sequence of the synchronization signal may be given based on the cell identifier and/or the subframe set to which the synchronization signal is transmitted and/or the subframe number for which the synchronization signal is transmitted. Alternatively, a sequence of synchronization signals may be provided based on cell identifiers and subframe sets.

For example, the terminal apparatus 2 may recognize in advance that the synchronization signal SS2 is located five subframes after the subframe in which the synchronization signal SS1 is disposed in a subframe set. That is, it may be given based on a predefined relationship (condition) that the subframe in which the synchronization signal SS1 is disposed and the subframe in which the synchronization signal SS2 is disposed belong to the same subframe set. Further, the terminal apparatus 2 may recognize in advance that the PBCH is disposed in the same subframe as the subframe in which the synchronization signal SS2 is disposed in a subframe set. That is, it may be given based on a predefined relationship (condition) that the subframe in which the synchronization signal SS2 is disposed and the subframe in which the reference signal is disposed belong to the same subframe set. Here, the relationship (condition) may be the information predefined by a specification or the like and known to both the base station apparatus 3 and the terminal apparatus 2.

For example, the terminal apparatus 2 performs the synchronization and the demodulation of the PBCH, assuming that, at least, the synchronization signals (SS1 and SS2) are transmitted from the same antenna port (or a set of antenna ports) common to one subframe (the subframe in which the synchronization signal SS1 and the reference signal are disposed) and to its corresponding subframe (after 5 subframes) (the subframe in which the synchronization signal SS2, the reference signal, and the PBCH are disposed), and the reference signal and the PBCH are transmitted from the same antenna port (or set of antenna ports).

Here, the synchronization signal may be disposed in a plurality of subframes in one subframe set as in the above example. Further, the synchronization signals may be disposed in a plurality of subframes in one subframe set, even in a case that the synchronization signal is constituted by a plurality of signals (for example, two types of PSS and SSS).

Also, the PBCH may be disposed from the nth symbol of the subframe in which the synchronization signal is detected. Also, the PBCH may be disposed from the nth symbol after m subframes from the subframe in which the synchronization signal is detected. For example, the relationship between the time position at which the PBCH is disposed and the time position at which the synchronization signal is disposed (detected) may be defined by specifications and the like, and information known to the base station apparatus 3 and the terminal apparatus 2. For example, in a case that the PBCH is disposed from the nth symbol after m subframes from the subframe in which the synchronization signal is detected, the terminal apparatus 2 may regard that at least the subframe in which the synchronization signal is detected and the subframe after m subframes from that subframe are included in the same subframe set.

Alternatively, the terminal apparatus 2 may detect the position of the PBCH by detecting a known signal transmitted on the same antenna port as the PBCH within the time and/or frequency resources configured in the relative position from the synchronization signal. Here, the known signal transmitted on the same antenna port as the PBCH may be a reference signal. Also, the known signal transmitted on the same antenna port as the PBCH may be a signal generated with a unique sequence for detecting the PBCH.

A reference signal (a reference signal transmitted via the same antenna port as the PBCH) that can be used for demodulating the PBCH (for channel compensation of the PBCH) is a known sequence in the terminal apparatus 2, and configured to be disposed in a known resource element in the terminal apparatus 2. For example, the reference signal may be disposed in a resource element uniquely associated with the cell identifier and/or subframe set information in the subframe. That is, based on the cell identifier and/or the subframe set to which the reference signal is transmitted, the position of the resource element on which the reference signal is disposed may be given. Also, for example, a sequence uniquely associated with the cell identifier, the subframe set information, and/or the subframe number may be used as the reference signal sequence. That is, a sequence of the reference signal may be given based on the cell identifier, information on the subframe set to which the reference signal is transmitted, and/or the subframe number to which the reference signal is transmitted.

Here, for example, reference signals transmitted using the same antenna port used for transmitting the PBCH are disposed in four resource elements at $(k, l)=(k_1, l_1)$, $(k_2, l_2)$, $(k_3, l_3)$, $(k_4, l_4)$, the terminal apparatus 2 may regard only the reference signals disposed in the resource elements at the position $(k, l)$ described above in the same subframe set to be the reference signals transmitted using the same antenna port as the PBCH. That is, the reference signal disposed to the $(k, l)$ resource element in a subframe that is not the same subframe set (a subframe belonging to a different subframe set) may be regarded as a reference signal transmitted using another antenna port.

At this time, a different (independent) antenna port number (a number for identifying an antenna port) for each subframe set may be defined (configured) in the $(k, l)$ resource element. Further, a common antenna port number to all subframe sets may be defined (configured) in the $(k, l)$ resource element, and the terminal apparatus 2 may regard only the signals disposed in the resource elements at the position $(k, l)$ described above in the same subframe set to be the reference signals transmitted using the same antenna port.

For example, FIG. 8 illustrates an example of an antenna port through which a physical signal and a physical channel are transmitted. In the subframe #0, the subframe #1, the subframe #5 and the subframe #6, belonging to the same subframe set, the Synchronization Signal (SS1) and the Synchronization Signal (SS2) are transmitted from the antenna port #10, and the Reference Signal (RS) and the PBCH are transmitted from antenna port p=20. Then, in the subframe #2, the subframe #3, the subframe #7 and the subframe #8 belonging to the same subframe set, the Synchronization Signal (SS1) and the Synchronization Signal (SS2) are transmitted from the antenna port p=11, and the Reference Signal (RS) and the PBCH are transmitted from the antenna port p=21. Further, in the subframe #4 and the subframe #9 belonging to the same subframe set, the Synchronization Signal (SS1) and the Synchronization Signal (SS2) are transmitted from the antenna port p=12, and the Reference Signal (RS) and the PBCH are transmitted from the antenna port p=22.

That is, different (independent) antenna ports may be defined (configured) between subframe sets, and the terminal apparatus 2 may regard only the signals transmitted in subframes belonging to the same subframe set as a signal transmitted from the same antenna port. At the stage of identifying the synchronization signal, the terminal apparatus 2 does not have to recognize to which number of antenna ports the physical signal and the physical channel are transmitted, and may simply regard the signal as the signal transmitted from the same antenna port (or a set of antenna ports) and demodulate the PBCH. Further, the terminal apparatus 2 may acquire information on the number of the antenna port based on information included in the MIB or information included in other broadcast information.

As another example, in FIG. 8, in the subframe #0, the subframe #1, the subframe #5, and the subframe #6 belonging to the same subframe set, the Synchronization Signal (SS1) and the Synchronization Signal (SS2) are transmitted from the antenna port p=10, and the Reference Signal (RS) and the PBCH are transmitted from the antenna port p=20. Then, in the subframe #2, the subframe #3, the subframe #7 and the subframe #8 belonging to the same subframe set, the Synchronization Signal (SS1) and the Synchronization Signal (SS2) are transmitted from the antenna port p=10, and the Reference Signal (RS) and the PBCH are transmitted from the antenna port p=20. Further, in the subframe #4 and the subframe #9 belonging to the same subframe set, the Synchronization Signal (SS1) and the Synchronization Signal (SS2) are transmitted from the antenna port p=10 and the Reference Signal (RS) and the PBCH are transmitted from the antenna port p=20. However, even if signals are regarded as being transmitted on the same antenna port, between each subframe set, signals may be disposed to subframes as signals applied a different precoding (signals to which independent precoding indices are applied).

That is, an antenna port that is common among subframe sets may be defined (configured), and the terminal apparatus 2 may regard only signals transmitted in subframes belonging to the same subframe set as signals transmitted on the same antenna port. The terminal apparatus 2, at the stage identifying the synchronization signal, recognizes the antenna port number of the antenna port through which the physical signal and the physical channel are transmitted. However, the terminal apparatus 2 may regard only the signals transmitted in subframes belonging to the same subframe set as the signals transmitted on the same antenna port (or a set of antenna ports), and may demodulate the PBCH.

The terminal apparatus 2 may, in accordance with the important information included in the demodulated PBCH or other system information (broadcast information) demodulated based on the information included in the demodulated PBCH, identify the subframe number of the subframe including the demodulated PBCH, and identify the subframe number of the subframe included in the same subframe set. In the case where the synchronization signal uniquely generated depending on the position of the subframe is used, the identification of the subframe number may be performed before the demodulating the PBCH.

The terminal apparatus 2 demodulates the PBCH and acquires information from the MIB. For example, the information included in the MIB may include part or all of the following information (A) to (D). (A) Information on the subframe set (B) Information on geographical identical transmission point (C) Access information (D) Superframe number.

Figure 9:
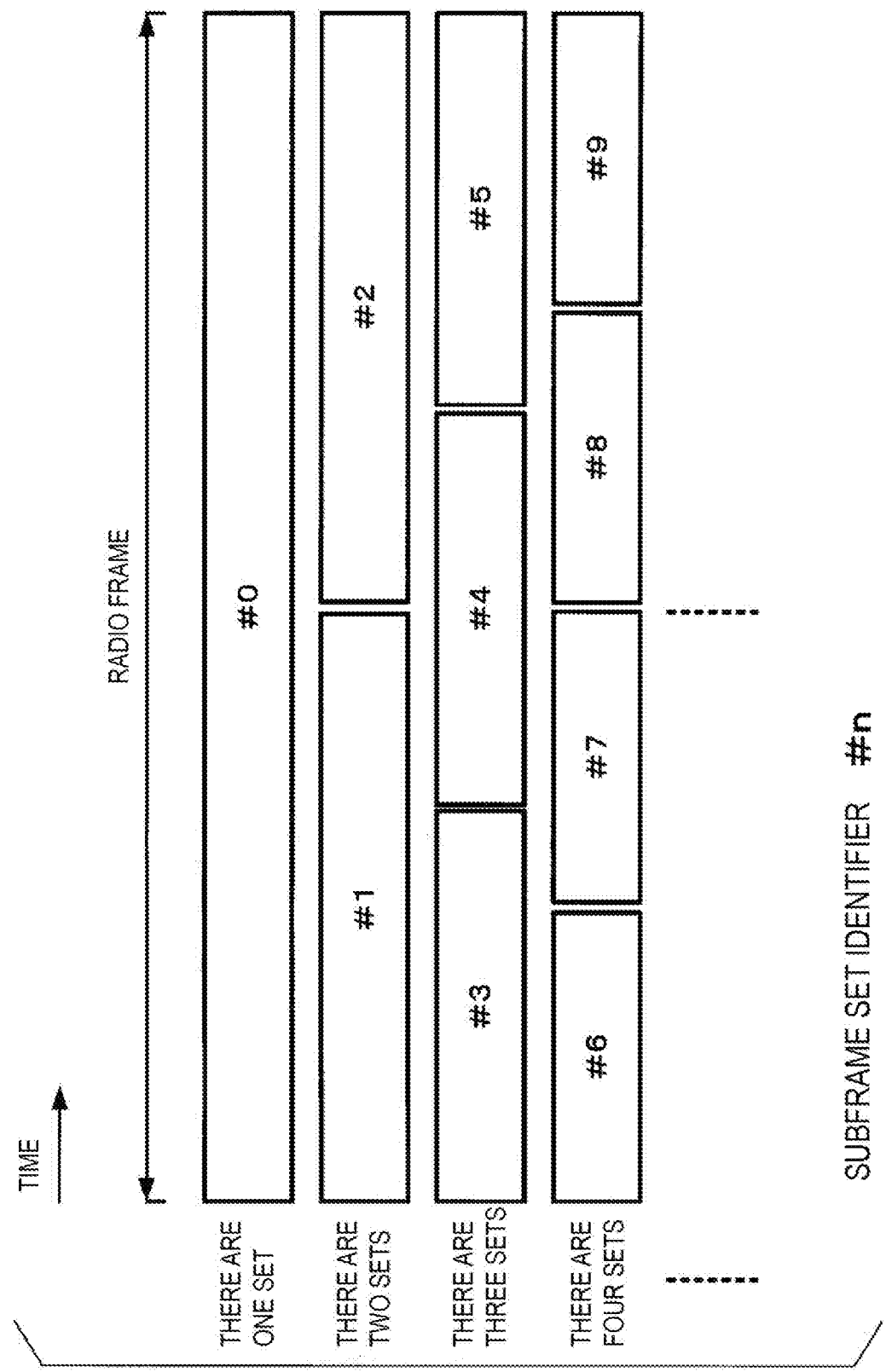
FIG. 9 is a diagram illustrating an example of a subframe set identifier according to an embodiment of the present invention.

Here, the information on the subframe set may include identifier information of a subframe set to which the subframe including the demodulated PBCH belongs. Also, the information on the subframe set may include the number of subframe sets in the cell. In addition, the information on the subframe set may include information on subframes that the terminal apparatus 2 may regard as the same subframe set. Here, for example, as illustrated in FIG. 9, the number of subframe sets and/or the position of subframe within a frame may be made uniquely identifiable based on the identifier information of the subframe set. This enables frames to be synchronized even in a case that the synchronization signal does not include information on the subframe set.

In addition, the information on the same geographical transmission point may include information (as essential information) indicating whether the antenna port of each subframe set is the same geographical transmission point. For example, it is True in a case that all subframe sets are transmitted from the same transmission point, and False in a case that a part or all of the subframe sets are transmitted from a different transmission point. This enables, a time synchronization processing to be performed using signals of a plurality of subframe sets in a case that all the subframe sets are transmitted from the same transmission point.

In addition, the access information may include permission information that enables the terminal apparatus 2 to identify whether the cell is to be regarded as an appropriate cell. In addition, information such as (1) whether the cell is operating a plurality of numerology, (2) which numerology is being used, (3) whether there is an auxiliary cell, and the like, may be included.

In addition, the superframe number may include information indicating a position in a superframe constituted by consecutive predetermined number of frames.

As in the example of the cell search described above, the terminal apparatus 2 is capable of suppressing the deterioration of reception performance caused by using signals of different subframe sets in the frame, by performing a processing on the assumption that the antenna port is set for each subframe set that includes each synchronization signal, in a case where a plurality of synchronization signals are detected, and the plurality of synchronization signals are generated based on the same cell identifier.

In the above explanation, for convenience, the subframe set is defined as a set of subframes, but the present invention is not limited to this, and the set may be defined as a set of subframes and/or slots, and/or symbols, and/or a combination thereof. For example, a set may be constituted by a symbol or slot including a synchronization signal and a subframe including a PBCH.

Configurations of apparatuses according to the embodiments of the present invention will be described below.

Figure 2:
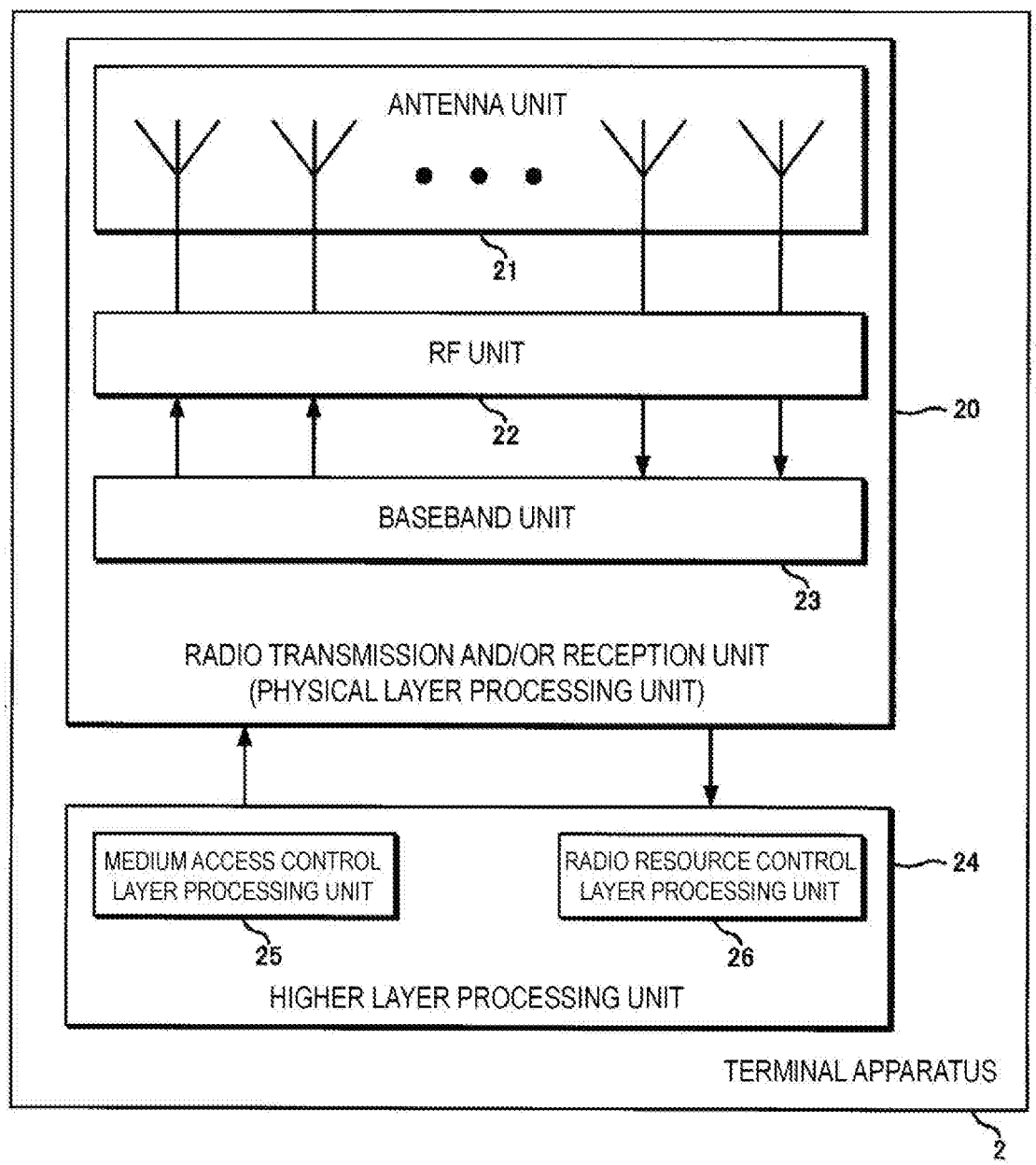
FIG. 2 is a block diagram illustrating an example of a schematic configuration of a terminal apparatus according to an embodiment of the present invention.

FIG. 2 is a schematic block diagram illustrating a configuration of the terminal apparatus 2 according to the present embodiment. As illustrated, the terminal apparatus 2 is configured to include a radio transmission and/or reception unit 20 and a higher layer processing unit 24. The radio transmission and/or reception unit 20 is configured to include an antenna unit 21, a Radio Frequency (RF) unit 12, and a baseband unit 13. The higher layer processing unit 24 is configured to include a medium access control layer processing unit 25 and a radio resource control layer processing unit 26. The radio transmission and/or reception unit 20 is also referred to as a transmitter, a receiver or a physical layer processing unit.

The higher layer processing unit 24 outputs uplink data (transport block) generated by a user operation or the like, to the radio transmission and/or reception unit 20. The higher layer processing unit 34 performs part or all of processing of the Medium Access Control (MAC) layer, the Packet Data Convergence Protocol (PDCP) layer, the Radio Link Control (RLC) layer, and the Radio Resource Control (RRC) layer.

The medium access control layer processing unit 25 included in the higher layer processing unit 24 performs processing of the Medium Access Control layer. The medium access control layer processing unit 25 controls transmission of a scheduling request, based on various types of configuration information/parameters managed by the radio resource control layer processing unit 26.

The radio resource control layer processing unit 26 included in the higher layer processing unit 24 performs processing of the Radio Resource Control layer. The radio resource control layer processing unit 26 manages various types of configuration information/parameters of its own apparatus. The radio resource control layer processing unit 26 sets various types of configuration information/parameters based on higher layer signaling received from the base station apparatus 3. That is, the radio resource control unit 26 sets the various configuration information/parameters in accordance with the information indicating the various configuration information/parameters received from the base station apparatus 3.

The radio transmission and/or reception unit 20 performs processing of the physical layer, such as modulation, demodulation, coding, decoding, and the like. The radio transmission and/or reception unit 20 demultiplexes, demodulates, and decodes a signal received from the base station apparatus 3, and outputs the information resulting from the decoding to the higher layer processing unit 24. The radio transmission and/or reception unit 20 generates a transmit signal by modulating and coding data, and performs transmission to the base station apparatus 3.

The RF unit 22 converts (down-converts) a signal received via the antenna unit 21 into a baseband signal by orthogonal demodulation, and removes unnecessary frequency components. The RF unit 22 outputs the processed analog signal to the baseband unit.

The baseband unit 23 converts the analog signal input from the RF unit 22 into a digital signal. The baseband unit 23 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 23 generates an SC-FDMA symbol by performing Inverse Fast Fourier Transform (IFFT) of the data, attaches CP to the generated SC-FDMA symbol, generates a baseband digital signal, and converts the baseband digital signal into an analog signal. The baseband unit 23 outputs the analog signal resulting from the conversion, to the RF unit 22.

The RF unit 22 removes unnecessary frequency components from the analog signal input from the baseband unit 23 using a low-pass filter, up-converts the analog signal into a signal of a carrier frequency, and transmits the up-converted signal via the antenna unit 21. Furthermore, the RF unit 22 amplifies power. Furthermore, the RF unit 22 may have a function of controlling transmit power. The RF unit 22 is also referred to as a transmit power control unit.

The base station apparatus 2 may be configured to include a plurality of part or all of the respective units in order to support multiple frequencies (frequency bands, frequency band widths) or transmission and/or reception processing in the same subframe of the cell.

Figure 3:
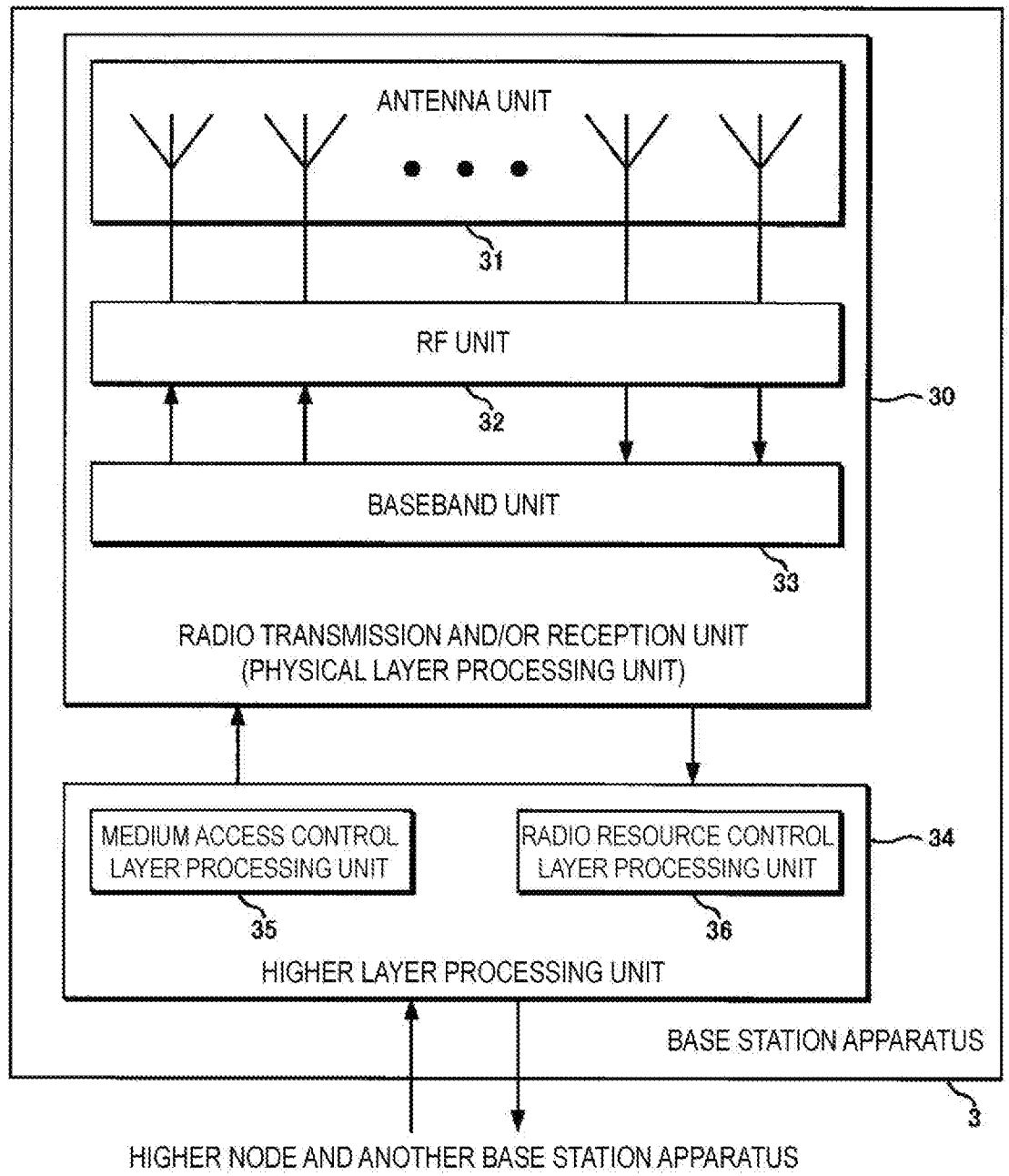
FIG. 3 is a block diagram illustrating an example of a schematic configuration of a base station apparatus according to an embodiment of the present invention.

FIG. 3 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs part or all of processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs Output to the radio transmission and/or reception unit 30. Furthermore, the radio resource control layer processing unit 36 manages various types of configuration information/parameters for each of the terminal apparatuses 2. The radio resource control layer processing unit 36 may set various types of configuration information/parameters for each of the terminal apparatuses 2 via the higher layer signaling. That is, the radio resource control layer processing unit 36 transmits/broadcasts information indicating various types of configuration information/parameters.

The functionality of the radio transmission and/or reception unit 30 is similar to the functionality of the radio transmission and/or reception unit 20, and hence description thereof is omitted. In a case that the base station apparatus 3 is connected to one or a plurality of transmission/reception points 4, some or all of the functions of the radio transmission and/or reception unit 30 may be included in each transmission/reception point 4.

Further, the higher layer processing unit 34 transmits (deliveries) or receives control messages or user data between the base station apparatuses 3 or between a higher-node network apparatus (MME or Serving-GW (S-GW)) and the base station apparatus 3. Although, in FIG. 3, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a radio resource management layer processing unit and an application layer processing unit exists in the higher order of the radio resource control layer processing unit 36.

"Units" in the drawing refers to constituent elements to provide the functions and the procedures of the terminal apparatus 2 and the base station apparatus 3, which are also represented by terms such as a section, a circuit, a constituting device, a device, a unit, and the like.

Each of the units having the reference signs 20 to 26 included in the terminal apparatus 2 may be configured as a circuit. Each of the units having the reference signs 30 to 36 included in the base station apparatus 3 may be configured as a circuit.

Hereinafter, various aspects of the terminal apparatus 2 and the base station apparatus 3 according to the embodiments of the present invention will be described.

(1) A first aspect of the present invention is a terminal apparatus including a receiver configured to receive a reference signal corresponding to a first subframe set constituted by one or a plurality of subframes and a first physical broadcast channel corresponding to the first subframe set, wherein, the reference signal corresponding to the first subframe set is transmitted using a same antenna port, and an antenna port used for transmitting the reference signal corresponding to the first subframe set and a first antenna port used for transmitting the first physical broadcast channel corresponding to the first subframe set are regarded as a same antenna port.

(2) In the first aspect of the present invention, an antenna port used for transmitting a reference signal corresponding to a second subframe set constituted by one or a plurality of subframes and a second antenna port used for transmitting a second physical broadcast channel corresponding to the second subframe set arc regarded as a same antenna port.

(3) In the first aspect of the present invention, a synchronizer is provided configured to determine a position of a first subframe belonging to the first subframe set in a radio frame, wherein
a position of the first subframe in the radio frame is indicated using a synchronization signal corresponding to the first subframe set.

(4) In the first aspect of the present invention, a position in a radio frame of a first subframe belonging to the first subframe set is indicated by broadcast information transmitted using the first antenna port.

(5) In the first aspect of the present invention, the broadcast information transmitted using the first antenna port includes information indicating whether a plurality of subframe sets are configured.

(6) In the first aspect of the present invention, the broadcast information transmitted using the first antenna port includes information for identifying a subframe set, information for identifying an antenna port, information for identifying a subframe to which synchronization signal corresponding to the first subframe set is transmitted, or information for identifying a subframe to which the broadcast information transmitted using the first antenna port is transmitted.

(7) A second aspect of the present invention is a base station apparatus including a transmitter configured to transmit a reference signal corresponding to a first subframe set constituted by one or a plurality of subframes and a first physical broadcast channel corresponding to the first subframe set, wherein, the reference signal corresponding to the first subframe set is transmitted using a same antenna port, and an antenna port used for transmitting the reference signal corresponding to the first subframe set and a first antenna port used for transmitting the first physical broadcast channel corresponding to the first subframe set are regarded as a same antenna port.

(8) In the second aspect of the present invention, an antenna port used for transmitting a reference signal corresponding to a second subframe set constituted by one or a plurality of subframes and a second antenna port used for transmitting a second physical broadcast channel corresponding to the second subframe set are regarded as a same antenna port.

(9) A third aspect of the present invention is a communication method applied to a terminal apparatus, the method at least including the step of receiving a reference signal corresponding to a first subframe set constituted by one or a plurality of subframes and a first physical broadcast channel corresponding to the first subframe set, wherein, the reference signal corresponding to the first subframe set is transmitted using a same antenna port, and an antenna port used for transmitting the reference signal corresponding to the first subframe set and a first antenna port used for transmitting the first physical broadcast channel corresponding to the first subframe set are regarded as a same antenna port.

(10) In the third aspect of the present invention, an antenna port used for transmitting a reference signal corresponding to a second subframe set constituted by one or a plurality of subframes and a second antenna port used for transmitting a second physical broadcast channel corresponding to the second subframe set are regarded as a same antenna port.

(11) A fourth aspect of the present invention is an integrated circuit implemented on a terminal apparatus, the integrated circuit causing the terminal apparatus to receive a reference signal corresponding to a first subframe set constituted by one or a plurality of subframes and a first physical broadcast channel corresponding to the first subframe set, wherein, the reference signal corresponding to the first subframe set is transmitted using a same antenna port, and an antenna port used for transmitting the reference signal corresponding to the first subframe set and a first antenna port used for transmitting the first physical broadcast channel corresponding to the first subframe set are regarded as a same antenna port.

(12) In the fourth aspect of the present invention, an antenna port used for transmitting a reference signal corresponding to a second subframe set constituted by one or a plurality of subframes and a second antenna port used for transmitting a second physical broadcast channel corresponding to the second subframe set are regarded as a same antenna port.

(13) A fifth aspect of the present invention is a terminal apparatus including a receiver configured to receive a synchronization signal corresponding to a subframe set constituted by one or a plurality of subframes wherein, in a case that the multiple subframe sets exist, the synchronization signal corresponding to a first subframe set is configured by a first sequence, and the synchronization signal corresponding to a second subframe set is configured by a second sequence.

(14) In the fifth aspect of the present invention, the first sequence and the second sequence are generated by multiplying a sequence by a binary code corresponding to each subframe set.

(15) In the fifth aspect of the present invention, the synchronization signal corresponding to the subframe set is transmitted at a different symbol position for each subframe set.

With this configuration, the terminal apparatus 2 is capable of starting efficiently communicating with the base station apparatus 3.

Note that the embodiments discussed thus far are merely examples, and the embodiments can be implemented using various kinds of modifications, replacement, or the like. For example, an uplink transmission scheme can be applied to both communication systems of a Frequency Division Duplex (FDD) scheme and a Time Division Duplex (TDD) scheme. The names of the parameters, events, and the like indicated in the embodiments are given for the sake of convenience of description; therefore, even when the actual applied names differ from the names in the embodiments of the present invention, the spirit of the invention claimed in the embodiments of the present invention is not affected in any way.

The term "connection" used in the respective embodiments is not limited to the configuration in which a certain device and another device are directly connected using a physical line, and includes a configuration in which the devices are logically connected, and a configuration in which the devices are radio-connected using the radio technology.

The terminal apparatus 2 is also referred to as a user terminal, a mobile station device, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a transmission and reception point (TRP), and a next generation Node B (gNB).

The base station apparatus 3 according to the present invention can also be realized as an aggregation (an apparatus group) constituted of multiple apparatuses. Each of the apparatuses configuring the apparatus group may include some or all portions of each function or each functional block of the base station apparatus 3 according to the above-described embodiment. The apparatus group may include each general function or each functional block of the base station apparatus 3. Furthermore, the terminal apparatus 2 according to the above-described embodiment can also communicate with the base station apparatus 3 as the aggregation.

Furthermore, the base station apparatus 3 according to the above-described embodiment may serve as an Evolved Universal Terrestrial Radio Access Network (EUTRAN) or a NextGen.Core. Furthermore, the base station apparatus 3 according to the above-described embodiment may have some or all portions of the functions of a node higher than an eNodeB.

A program running on an apparatus according to an aspect of the present invention may serve as a program that controls a Central Processing Unit (CPU) and the like to cause a computer to operate in such a manner as to realize the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for realizing such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the embodiment described above may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

One embodiment of the present invention may be utilized in, for example, a communication system, a communication apparatus (for example, a mobile phone device, a base station apparatus, a wireless LAN apparatus, or a sensor device an integrated circuit (for example, a communication chip), a program, or the like.

REFERENCE SIGNS LIST

2 Terminal apparatus
3 Base station apparatus
20, 30 Radio transmission and/or reception unit
21, 31 Antenna unit
22, 32 RF unit
23, 33 Baseband unit
24, 34 Higher layer processing unit
25, 35 Medium access control layer processing unit
26, 36 Radio resource control layer processing unit
4 Transmission reception point

The invention claimed is:

1. A terminal apparatus for communicating with a base station apparatus, the terminal apparatus comprising:
  a receiver configured to receive, from the base station apparatus, a plurality of signals, wherein the plurality of signals comprise a primary synchronization signal (PSS), a secondary synchronization signal (SSS), a physical broadcast channel (PBCH), and a reference signal associated with the PBCH, wherein the PBCH comprises at least a part of a system frame number; and
  a processor configured to:
    determine an identifier based on the PBCH and the reference signal associated with the PBCH,
      wherein the identifier that uniquely identifies the plurality of signals and a time location of the plurality of signals within a predetermined duration; and
    acquire the part of the system frame number on the PBCH.

2. A base station apparatus for communicating with a terminal apparatus, the base station apparatus comprising:
  a transmitter configured to transmit, to the terminal apparatus, a plurality of signals, wherein the plurality of signals comprise a primary synchronization signal (PSS), a secondary synchronization signal (SSS), a physical broadcast channel (PBCH), and a reference signal associated with the PBCH; and
  a processor configured to:
    determine an identifier based on a time location of the plurality of signals within a predetermined duration;
    generate the PBCH based on the identifier,
      wherein the identifier identifies the plurality of signals and the time location of the plurality of signals within the predetermined duration; and
    provide at least a part of a system frame number on the PBCH.

3. A communication method for communicating with a base station apparatus, the communication method comprising:
  receiving, from the base station apparatus, a plurality of signals, wherein the plurality of signals comprise a primary synchronization signal (PSS), a secondary synchronization signal (SSS), a physical broadcast channel (PBCH), and a reference signal associated with the PBCH, wherein the PBCH comprises at least a part of a system frame number;

determining an identifier based on the PBCH and the reference signal associated with the PBCH,
    wherein the identifier that uniquely identifies the plurality of signals and a time location of the plurality of signals within a predetermined duration; and
acquiring the part of the system frame number on the PBCH.

4. A communication method for communicating with a terminal apparatus, the communication method comprising:
transmitting, to the terminal apparatus, a plurality of signals, wherein the plurality of signals comprise a primary synchronization signal (PSS), a secondary synchronization signal (SSS), a physical broadcast channel (PBCH), and a reference signal associated with the PBCH;
determining an identifier based on a time location of the plurality of signals within a predetermined duration;
generating the PBCH based on the identifier,
    wherein the identifier identifies the plurality of signals and the time location of the plurality of signals within the predetermined duration; and
providing at least a part of a system frame number on the PBCH.

5. The terminal apparatus of claim 1, wherein:
the plurality of signals are a first plurality of signals;
the PSS is a first PSS;
the SSS is a first SSS;
the PBCH is a first PBCH;
the reference signal is a first reference signal;
the identifier is a first identifier;
the time location is a first time location within the predetermined duration; and
a second plurality of signals is transmitted within the predetermined duration by the base station apparatus, wherein the second plurality of signals comprise a second PSS, a second SSS, a second PBCH, a second reference signal associated with the second PBCH,
wherein the second PBCH is generated based on a second identifier,
    wherein the second identifier identifies the second plurality of signals and a second time location of the second plurality of signals within the predetermined duration.

6. The base station apparatus of claim 2, wherein:
the plurality of signals are a first plurality of signals;
the PSS is a first PSS;
the SSS is a first SSS;
the PBCH is a first PBCH;
the reference signal is a first reference signal;
the identifier is a first identifier;
the time location is a first time location within the predetermined duration;
the transmitter is further configured to transmit a second plurality of signals within the predetermined duration, wherein the second plurality of signals comprise a second PSS, a second SSS, a second PBCH, a second reference signal associated with the second PBCH; and
the processor is further configured to:

determining a second identifier based on a second time location of the second plurality of signals within the predetermined duration:
generating the second PBCH,
    wherein the second identifier identifies the second plurality of signals and the second time location of the second plurality of signals within the predetermined duration; and
providing at least a part of the system frame number on the second PBCH.

7. The communication method of claim 3, wherein:
the plurality of signals are a first plurality of signals;
the PSS is a first PSS;
the SSS is a first SSS;
the PBCH is a first PBCH;
the reference signal is a first reference signal;
the identifier is a first identifier;
the time location is a first time location within the predetermined duration; and
a second plurality of signals is transmitted within the predetermined duration by the base station apparatus, wherein the second plurality of signals comprise a second PSS, a second SSS, a second PBCH, a second reference signal associated with the second PBCH,
wherein the second PBCH is generated based on a second identifier,
    wherein the second identifier identifies the second plurality of signals and a second time location of the second plurality of signals within the predetermined duration.

8. The communication method of claim 4, wherein:
the plurality of signals are a first plurality of signals;
the PSS is a first PSS;
the SSS is a first SSS;
the PBCH is a first PBCH;
the reference signal is a first reference signal;
the identifier is a first identifier;
the time location is a first time location within the predetermined duration; and
the communication method further comprises:
    transmitting a second plurality of signals within the predetermined duration, wherein the second plurality of signals comprise a second PSS, a second SSS, a second PBCH, a second reference signal associated with the second PBCH;
    determining a second identifier based on a second time location of the second plurality of signals within the predetermined duration:
    generating the second PBCH based on the second identifier,
        wherein the second identifier identifies the second plurality of signals and the second time location of the second plurality of signals within the predetermined duration; and
    providing at least a part of the system frame number on the second PBCH.

* * * * *